United States Patent [19]
Hurley et al.

[11] 3,715,131
[45] Feb. 6, 1973

[54] CHEMICAL GAS GENERATING DEVICE FOR AN AUTOMOBILE SAFETY SYSTEM

[75] Inventors: Eldon K. Hurley, Wharton; Robert S. Maule; Rocco C. Musso, both of Kenvil; Lowell E. Smith, Bernardsville, all of N.J.

[73] Assignee: Hercules Incorporated, Wilmington, Del.

[22] Filed: June 4, 1971

[21] Appl. No.: 149,981

Related U.S. Application Data

[63] Continuation-in-part of Ser. No. 35,795, May 8, 1970, abandoned.

[52] U.S. Cl. ............. 280/150 AB, 23/281, 149/109, 423/351
[51] Int. Cl. ............................................. B60c 21/10
[58] Field of Search ...... 280/150 AB; 102/39, DIG.8; 149/109; 23/104, 220, 281; 252/181.3, 181.4

[56] References Cited

UNITED STATES PATENTS

| | | | |
|---|---|---|---|
| 2,285,843 | 6/1942 | Smith | 23/104 |
| 2,371,707 | 3/1945 | Rainier | 252/183.3 |
| 2,850,291 | 9/1958 | Ziccardi | 280/150 AB |
| 3,066,014 | 11/1962 | White et al. | 23/281 |
| 3,641,935 | 2/1972 | Gawlick et al. | 102/39 |
| 3,663,035 | 5/1972 | Norton | 280/150 AB |

OTHER PUBLICATIONS

Fundamental Chemistry (textbook); by Horace Deming; Published by J. Wiley Inc. in 1940, page 444.

Primary Examiner—Kenneth H. Betts
Attorney—Michael B. Keehan

[57] ABSTRACT

A gas generator capable of supplying sufficient gas to inflate an inflatable bag of a bag-type automobile safety system within the time limitations of the system is provided. A gas generating charge comprising a stabilized admixture of alkali or alkaline metal nitride and an ammonium salt is initiated to a sufficient reaction rate by an initiating charge extending substantially through the length of the gas generating charge to supply the necessary gases.

13 Claims, 5 Drawing Figures

PATENTED FEB 6 1973 3,715,131

ELDON K. HURLEY
ROBERT S. MAULE
ROCCO C. MUSSO
LOWELL E. SMITH
*INVENTORS*

BY *Michael S. Liehan*

ATTORNEY

ELDON K. HURLEY
ROBERT S. MAULE
ROCCO C. MUSSO
LOWELL E. SMITH
*INVENTORS*

BY

*ATTORNEY*

CHEMICAL GAS GENERATING DEVICE FOR AN AUTOMOBILE SAFETY SYSTEM

This application is a continuation-in-part of our copending application, Ser. No. 35,795, filed May 8, 1970, now abandoned.

This invention relates to a vehicle safety system for providing protection for passengers of a vehicle when the vehicle is subjected to violent forces such as rapid deceleration forces encountered in a collision. More particularly, this invention relates to a gas generator device particularly suitable for use in an inflatable bag type vehicle safety system in which an inflatable bag is employed to restrain movements of the passengers of the vehicle in the event of a collision. In still another aspect, this invention relates to an inflatable bag type automobile safety system employing a chemical gas generator for providing gas for inflation of an inflatable bag.

In recent years extensive research and development has been conducted in order to make motor vehicles and in particular automobiles safer for passengers in the event of a collision. A significant advancement in this safety effort has been the development of an inflatable bag safety system. This type of safety system is basically comprised of an inflatable bag, a collision sensing element, and a gas supply source. The collision sensing element actuates operation of the gas supply source in response to a collision. The gas supply source inflates the bag within milliseconds from the instant of the collision. The bag(s) are generally stored within the vehicle directly forward of the seats such as, for example, in the dashboard of an automobile. The bag in its inflated condition restrains movement of the passenger and cushions the passenger from severe impact with structural elements of the vehicle.

Present systems for inflating inflatable bags for a vehicle safety system principally employ pressurized gas contained within a pressure resistant storage chamber as the gas supply source. In these systems, gas under high pressure is released into the inflatable bag from the pressure resistant storage chamber through the action of an explosive charge which functions to rupture a metal closure in the storage container. Gas flows through the ruptured metal closure of the pressure vessel into the bag which is in a normally collapsed condition and inflates the bag. There are several disadvantages to the safety system heretofore described.

First, storage vessels under pressure, on the order of about 3,500 p.s.i. or above, must be stored within the vehicle. Second, the rapid response time necessary in order to expand the inflatable bag within the time required to provide protection for a passenger necessitates use of an explosive actuator such as a blasting cap to rupture the storage vessel. A third disadvantage of the pressurized gas storage system is that the pressure resistant storage chamber is comparatively large and heavy. Because of the disadvantages of the compressed gas system, a reliable chemical gas generation system and device has been desired.

One class of gas generating compositions suggested for use in an automobile safety system to substantially reduce or eliminate the disadvantages of the compressed gas system comprises an admixture of alkali or alkaline metal nitrites and an ammonium salt. Compositions of this type have been used for blasting in mines and have been referred to sometimes in the prior art as "Hydrox" powders or compositions. Reaction rates of these compositions are pressure sensitive. A discussion of "Hydrox" powders is contained in a book by James Taylor entitled "Solid Propellant and Exothermic Compositions," Interscience Publishers, Inc., New York, N.Y., 1959.

Initial attempts to utilize the alkali metal nitrite-ammonium chloride type gas generating composition for an automobile safety system were not successful because the inflatable bag was not filled to a satisfactory inflation pressure within the time limit requirements of the system. In the course of work in attempting to employ alkali metal nitrite-ammonium salt compositions as a gas generating composition it was found that these compositions could be initiated to reaction at a rate sufficient for use in a vehicle safety system if core initiation of the composition was employed. By the term "core initiation," it is meant that the main gas generating charge is initiated to reaction substantially throughout the length of the charge all at one time.

Therefore, in accordance with this invention a gas generator device and vehicle safety system employing this device is provided comprising a gas generator body having a pressure resistant chamber, an initiating element at one end of the reaction chamber, said initiating element extending along the longitudinal axis of the pressure resistant reaction chamber and through a substantial portion of the length of said chamber, and a discharge orifice at the opposite end of the gas generator body said discharge orifice being sealed with pressure responsive means having a release pressure of at least about 1,500 p.s.i. or above. The pressure resistant reaction chamber is filled with a main gas producing charge, sometimes referred to herein as the main charge, comprising a nonexplosive, gas producing composition capable of self-sustained reaction once initiated, said main charge composition comprising an intimate admixture of an alkali or alkaline metal nitrite or mixtures thereof and an ammonium salt, said main charge composition containing at least about 4 percent by weight of a stabilizing agent, based on the weight of the admixture containing said stabilizing agent. The initiating element comprises a squib and an integral and elongate initiating charge in operative relationship to the squib, said initiating charge extending through a substantial portion of the main charge. The main charge composition is in a contiguous relationship with the initiating charge. When the initiating element is initiated, it rapidly starts reaction of the main charge whereby a rapid gas pressure increases within the pressure resistant chamber until said pressure reaches the release pressure of the pressure responsive means whereby the gas is released and flows from the pressure resistant chamber into the inflatable bag. The gas generating device of this invention is capable of providing sufficient gas, within about 40 milliseconds from the sensing of a collision, to fill an inflatable bag having a nominal capacity of from about one to about ten cubic feet to a pressure of about 5 p.s.i.g.

For core initiation of the main gas producing charge to take place, the initiating element and in particular the initiating charge of the initiating element must extend throughout a substantial portion of the main gas producing charge. By the term "substantial portion" is meant that the initiating charge extends along at least 80 percent of the length of the main charge, the length of the main charge being defined by the containing means into which the main charge is loaded.

The main charge of this invention can be a stoichiometric mixture of particulate ammonium salt and alkali or alkaline metal nitrite and containing a stabilizing agent.

Illustrative alkali and alkaline metal nitrites which can be employed in the main charge of this invention include sodium nitrite, potassium nitrite, magnesium nitrite, calcium nitrite, mixtures thereof and the like.

Illustrative ammonium salts which can be employed in the main charge of this invention include ammonium chloride, ammonium bromide, ammonium iodide, ammonium sulfate, ammonium sulfamate, mixtures thereof and the like.

There are many well known stabilizing agents for mixtures of alkali or alkaline metal nitrites and ammonium salts. These stabilizing agents include anhydrous sodium carbonate, anhydrous ammonium carbonate, and the oxides, carbonates and bicarbonates of the alkaline earth metals such as magnesium, calcium or zinc and in particular, magnesium oxide. Stabilizing agents are employed in amounts of from at least about 4 to about 8 percent by weight, based on the weight of a gas generating composition containing said stabilizing agent. The preferred stabilizing agent is magnesium oxide.

The gas generating composition comprising the main charge must contain a stabilizing agent and should be treated to improve the storage stability of the main charge containing a stabilizing agent. The stability of the basic composition is known to deteriorate during storage, particularly at elevated temperature. One suitable method for stabilizing the compositions for long term storage is as follows. Alkali or alkaline metal nitrite and the ammonium salt are dried by heating the components separately at temperatures of about 170°C. or above. At temperatures of about 170°C. or above, most alkali or alkaline metal nitrites and ammonium salts lose their ability to retain moisture. Heating at elevated temperatures must be continued for a sufficient time for the gas generating components to become substantially bone dry. The stabilizing agent is dried separately at a high temperature of about 180°C. to about 190°C. to remove substantially all of the moisture therefrom. Determination of substantially complete removal of moisture from the stabilizing agent can be made from weight-loss measurements employing thermogravimetric analysis. The predried ingredients of the main charge are then mixed. To achieve improved stability it is necessary that the dried stabilizing agent be admixed with either the alkali or alkaline metal nitrite, or the ammonium salt to form a first admixture prior to adding the unmixed component. It is preferred to cool all components to ambient temperature before mixing. The resulting stabilized gas generating composition should be stored in a moisture free environment. In the process for improving the stability of Hydrox compositions heretofore described, the stabilizing agent must comprise at least about 5 percent by weight of the composition containing said stabilizing agent. For optimum stability, the moisture content of the dried Hydrox composition prepared as described should not exceed 0.0015 percent by weight (calculated).

In preparing the main gas producing charge it is preferred to employ a slight stoichiometric excess of alkali or alkaline metal nitrite, say from about 2 to about 4 percent by weight. The slight excess of the alkali or alkaline metal nitrite is desirable to provide an oxygen balance for the total consumable charge within the gas generator device, i.e., the main charge and the initiating charge.

The initiating element of this invention is comprised of a squib and an integral initiating charge adjacent to the squib. The initiating charge is prepared in an integral and elongate configuration so that it will extend into and throughout a substantial portion of the main charge, the main charge being contiguous with the surface of the initiating charge. By the term "integral" is meant that the initiating charge is either self-supporting such as a molded charge or that it is held with a permeable container such as a fine wire mesh basket, a thin metal tube or a consumable container such as a thin elongate plastic container made from polyethylene or polypropylene film.

Illustrative initiating compositions which are suitable for use as the initiating charge include finely divided particles of a primarily heat producing material such as boron-potassiumnitrate, boron-lead-chromate, and lead oxide/boron having an average particle size range of about 100 – 300 microns. These compositions can be employed with a squib alone or they can be employed in combination with a gas producing charge and squib as illustrated in FIGS. 2, 3 and 5. Initiating compositions of the latter type are preferred. The amount of initiating charge employed to initiate reaction of the gas producing main charge is at least 2 percent by weight based on the weight of the main charge composition.

Illustrative gas producing charges which can be employed in the initiating charge include smokeless powder and sodium azide. The term "smokeless powder" is defined herein to include single base, double base and triple base types of powder. Single base powder consists primarily of nitrocellulose containing a stabilizing agent. Double base powder is principally comprised of nitrocellulose plasticized with nitroglycerin. Triple base powder is prepared from a mixture of nitrocellulose plasticized with nitroglycerin and containing nitroguanidine.

When the initiating charge is comprised of a heat producing charge and a gas producing charge, these charges can be maintained as segregated charges directly adjacent to each other so as to be in an operative relationship and to form one elongate charge, or the individual heat and gas producing charge can be prepared as an intimate admixture. When the initiating charge is prepared from segregated charges held within a container such as a fine wire mesh basket, the heat producing charge is adjacent to the squib and the gas producing charge is adjacent to the heat producing charge. An initiating charge of this type is comprised of from about 30 to about 50 percent by weight of a heat producing charge and from 70 to about 50 percent by weight of a gas generating charge. The heat producing charge is employed in particulate form. Generally about 30–50 percent of the heat producing charge can have an average particle size of about 100 microns, with the remaining portion of the heat producing charge having a larger average particle size of up to about 125 mils. The gas producing charge is also employed in particulate form. A suitable average particle size for smokeless powder employed in this initiating charge is about 40 mils.

Squibs employed in the initiating element of this invention are electrically actuated flame producing devices. Any squibs of the conventional type can be employed. These squibs should have an ignition delay time not exceeding about 10 milliseconds. The flame produced from the initiating element is of extremely short duration and is totally maintained with the pressure resistant chamber of the gas generator body.

The following drawings, description and examples more fully illustrate the gas generator device of this invention. In the drawings like numbers refer to like parts where applicable.

Figure 1:
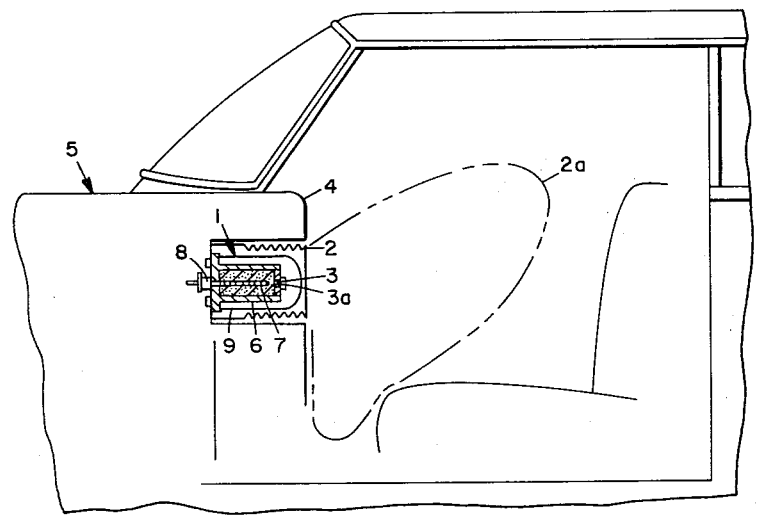
FIG. 1 is a schematic view of the vehicle safety system of this invention mounted within an automobile.

In FIG. 1 an embodiment of the vehicle safety system of this invention is illustrated. A gas generator device 1 having an inflatable bag 2 in a collapsed condition in communication with a discharge orifice 3 of the gas generator device 1 is shown mounted within the dashboard 4 of automobile 5. The gas generator device 1 has a pressure resistant chamber 6, a gas producing charge 7 filling the pressure resistant chamber 6, an initiating element 8, a discharge orifice 3 and a rupture disc 3a sealing discharge orifice 3. A diffuser 9 is mounted on the outside of the gas generator device intermediate the discharge orifice 3 of the gas generator device 1 and the inflatable bag 2. The gas producing charge 7 is initiated by the initiating element 8 which operates in response to receipt of an electrical impulse from a collision sensing element (not shown). The gas producing charge reacts rapidly producing sufficient gas pressure to burst rupture disc 3a inflating the inflatable bag 2 to an inflated condition 2A shown in phantom.

Figure 2:
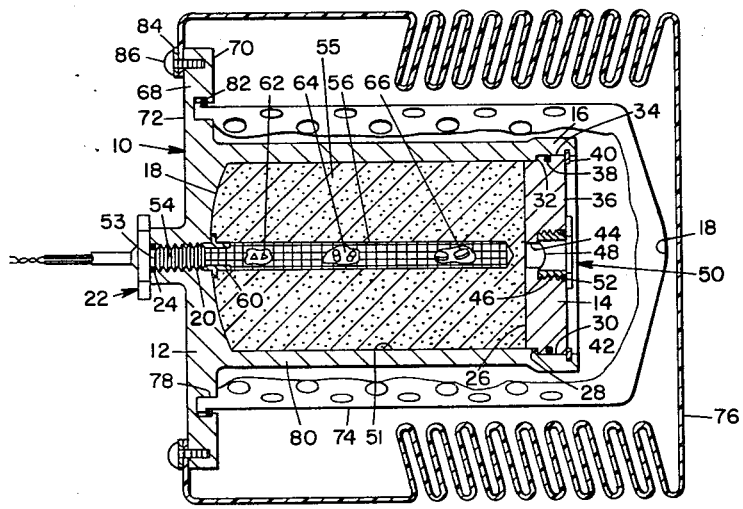
FIG. 2 is a longitudinal view partly broken away and partly in section of the gas generator device and safety system of this invention.

In FIG. 2 the embodiment of the gas generator device and system shown schematically in FIG. 1 is illustrated in detail. The gas generator device comprises a pressure resistant gas generator body 10 having a head assembly 12 and a closure plate 14. The head assembly 12 is cylindrical in shape, is open at the aft-end 16 and has a closed end 18 in the shape of a dished head, said closed end having a threaded opening 20 for receiving an initiator element 22. The initiator element 22 is installed in threaded opening 20 compressing an "O" ring 24, making a pressure tight seal. Closure plate 14 is inserted into the aft-end 16 of the head assembly 12. The closure plate 14 has a reduced forward diameter 26 which defines a first bearing surface 28. The aft-end 16 of the head end assembly 12 has a larger internal diameter 30 than the internal diameter of the gas generator body 10, providing a second bearing surface 32. Closure plate 14 is sized so that it can be inserted and moved forward into the open end 16 of the head assembly 12 until the first and second bearing surfaces 28, 32 are in engaging relationship. Closure plate 14 has a circumferential groove 34 about major diameter 36. An "O" ring 38 fits into circumferential groove 34. Closure plate 14 is held tightly in place with retaining ring 40 which is secured in circumferential groove 42 at the aft-end 16 of the interior walls of head assembly 12. Closure plate 14 has a centrally positioned orifice 44 and exhaust port 46 in communication with orifice 44. Exhaust port 46 is threaded. A rupture disc assembly comprising a rupture disc 48, rupture disc plug 50 and "O" ring 52 is screwed into exhaust port 46 making a pressure tight seal. The gas generator device when assembled as described forms a pressure resistant internal chamber 51. This internal chamber 51 is filled with the main gas generator charge 55 prior to assembly.

The initiating element 22 is comprised of a threaded head 53 having an internal cavity in which a squib 54 is secured and an initiator charge sub-assembly comprising an elongate steel mesh basket 56 containing an initiator charge. The elongate basket 56 has a threaded forward end 60 which is screwed into the base of threaded opening 20 in the closed end 18 of the head assembly 12. The head 53 of the initiating element is screwed into the top of threaded opening 20. The initiator charge contained within initiator basket 56 is comprised of a heat producing charge comprising fine particle $BKNO_3$ 62 and $BKNO_3$ pellets 64, and a gas producing charge comprising sodium azide particles 66. Each of the charges 62, 64, 66 is packaged within a separate plastic bag such as a polyethylene bag (not shown). The charges 62, 64, 66 are placed into elongate basket 56. When the head 53 of initiating element 22 containing squib 54 is installed through the threaded opening 20 in the gas generator body head assembly 12, the squib 54 and the heat producing charge described are in a substantially contiguous relationship.

The head assembly 12 of the gas generator body 10 has a lip 68 extending outwardly around the entire exterior surface of the chamber body at the forward end thereof. As shown, lip 68 has a forward surface 70 and a rearward surface 72. Lip 68 is integral with the chamber body and is employed for purposes of providing a mounting surface for diffuser 74, inflatable bag 76 and for attachment to a vehicle. Lip 68 has a circumferential groove 78 in the rearward surface 72. Diffuser 74 is a perforated cylinder open at one end and closed at the opposite end with a solid concave head. Diffuser 74 encloses the cylindrical portion 80 of the gas generator body 12 and the closure plate 14 and is designed so that it is spaced apart from the gas generator body 12 and closure plate 14 thereby providing a cavity about the gas generator. The diffuser 74 is secured in circumferential groove 78 in rearward surface 72 of lip 68 with a retaining ring 82. Inflatable bag 76 covers the diffuser 74 and is secured and sealed to the forward surface 70 of lip 68 with a sealing ring 84. Machine screws 86 are employed to maintain the sealing ring 84 in place.

Figure 3:
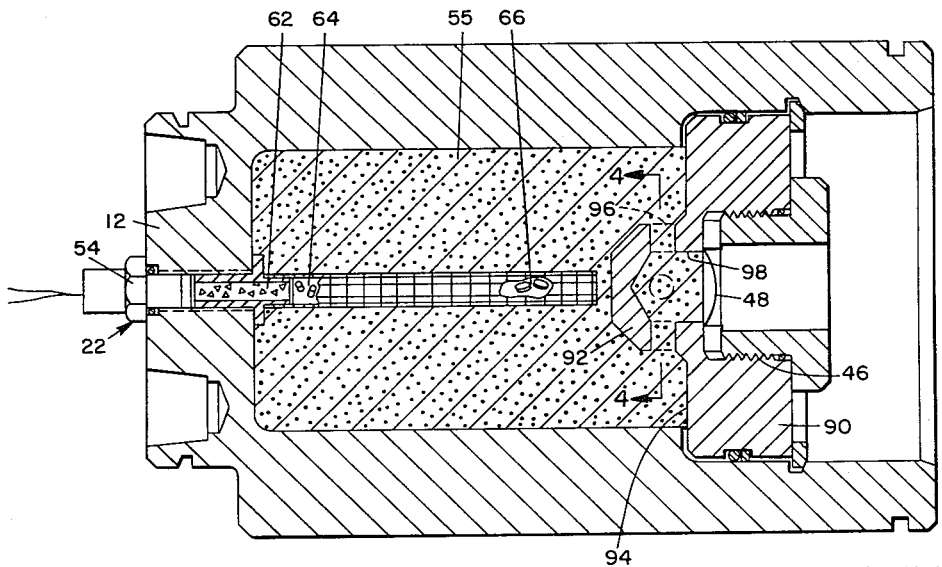
FIG. 3 is a longitudinal view partly broken away and partly in section illustrating another embodiment of the gas generating device of this invention.
Figure 4:
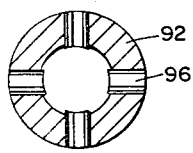
FIG. 4 is a partial view in section along lines 4—4 of FIG. 3.

FIG. 3 illustrates a second embodiment of the gas generator device of this invention. This gas generator device employs a closure plate designed to momentarily increase the residence time for the gas produced by reaction of the main charge in the reaction chamber by providing a longer gas flow path for the gases exiting through the discharge orifice of the generator. In the embodiment shown in FIG. 3 closure plate 90 has a centrally positioned forward projection 92 extending from the forward surface 94 of the closure plate 90. Projection 92 has a plurality of ports 96 and a central orifice 98 through which reaction gases are exhausted during use of the device for inflation purposes. The vent ports 96 in the projection 92 are positioned at an angle of about 90° to the longitudinal axis of the assembled gas generator device and are in communication with the discharge orifice 98 of the closure plate. FIG. 4 is a detail showing the vent ports 96 in the forward projection 92 of closure plate 90.

Figure 5:
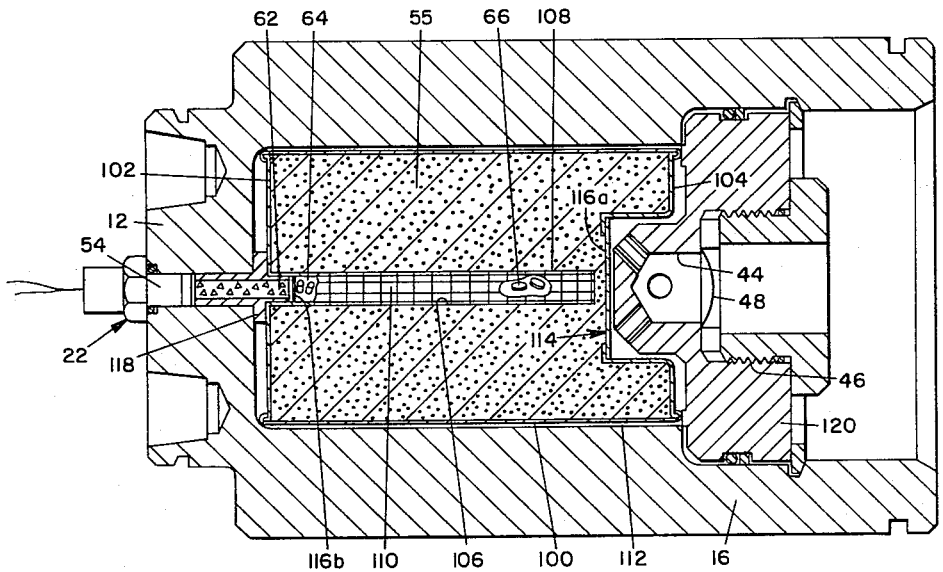
FIG. 5 is a longitudinal view partly broken away and partly in section illustrating still another embodiment of the gas generating device of this invention.

In FIG. 5 another embodiment of the gas generating device of this invention is illustrated in which the main charge and initiator charge are hermetically sealed within a prepackaged cartridge. The cartridge 100 is comprised of a cylinder having a forward-end 102 and an aft-end 104. The cartridge 100 is sized so that it can be slidably inserted into the aft-end 16 of head assembly 12 of the gas generator body. There is a central cavity 106 in the forward end 102 of cartridge 100. Central cavity 106 extends substantially throughout the length of the cartridge 100. Central cavity 106 is defined by a cylindrical basket 108 having a plurality of vents 110 communicating the cavity 106 to the internal chamber 112 defined by said cylindrical basket 108 and the exterior surface of cartridge 100. The main charge 55 is loaded into the chamber 112 of cartridge 100 through an opening 114 in the aft-end 104 of the cartridge 100. The opening 114 is sealed with a metal foil 116a which is adhesively secured to the aft-surface of the cartridge. Central cavity 106 is filled with an initiator charge 64, 66 which is sealed within basket 108 with metal foil 116b. Cartridge 100 is adhesively secured to a ferrule 118 containing charge 62. In this secured position the charge 62 of fine particle $BKNO_3$ held within a plastic bag (not shown) is in a substantially contiguous relationship with initiator charge 64. Ferrule 118 is secured within the threaded opening 20. Cartridge 100 is illustrated in a loaded position in which the squib 54 in the head of the initiating element 22 and the initiating charge 62, 64 and 66 are in an operative relationship. Closure plate 120 holds cartridge 100 in a loaded position.

The following examples further illustrate this invention. In the examples all parts and percentages are by weight unless otherwise specified.

EXAMPLES 1-5

Gas generator devices as illustrated in FIG. 2 are filled with a main charge and an initiating charge. The internal chamber of the gas generator device is 5 inches long and 3 inches in diameter. The basket containing the initiating charge weighing 2.0 grams is 0.2 inches in diameter and extends through 80 percent of the length of the internal chamber of the gas generator device. The initiating charge for these tests comprises 20 parts of $BKNO_3$ having an average particle size of about 100 microns, 30 parts of $BKNO_3$ pellets having an average particle size of about 125 mils, and 50 parts of smokeless powder. Each of the charges is sealed in a polyethylene bag and positioned in the initiation basket as shown in FIG. 2. The cavity in the internal chamber of the gas generating device surrounding the initiating element is packed full with a main charge having a composition as set forth in Table I. Each gas generator device employs a conventional squib, type S6EO manufactured and sold commercially by Hercules Incorporated. This squib has a firing time of 7 milliseconds at 1.0 amp. direct current. In the tests conducted the burst disc of the device has a nominal release pressure of 2,000 p.s.i. The discharge orifice of the gas generator device is connected by a ½ inch diameter pipe 18 inches in length to an inflatable bag having a nominal capacity of one ft.$^3$. Gas generators as heretofore described are tested and the test results are set forth in Table I.

EXAMPLES 6-8

Examples 1-5 are repeated with the exception that a core initiation of the main gas producing charge is not employed. In Examples 6 and 7 the initiating element is positioned at the forward face of the forward end of the pressure resistant chamber. In Example 8 the initiating element is positioned at the aft-surface of the pressure resistant chamber and is spaced from the discharge orifice. Gas generators employing initiators positioned within the pressure resistant chamber as described are tested and the test results are set forth in Table I below:

TABLE I

| Ex. No. | Composition of Charge (grams) $NH_4Cl$ | $NaNO_2$ | MgO | Time to Full Inflation of Bag(A) (milliseconds) | Maximum Pressure In Bag (p.s.i.g.) |
|---|---|---|---|---|---|
| 1 | 12.3 | 17.7 | 0.6 | 26.5 | 6.2 |
| 2 | 12.3 | 17.7 | 0.6 | 25.5 | 11.4 |
| 3 | 12.3 | 17.7 | 0.6 | 23.5 | 8.6 |
| 4 | 12.3 | 17.7 | 1.6 | <40.0 | - |
| 5 | 12.3 | 17.7 | 1.9 | <40.0 | - |
| 6 | 12.3 | 17.7 | 0.6 | 17.0(B,C) | 1.9 |
| 7 | 12.3 | 17.7 | 0.6 | 18.0(B,C) | 2.9 |

(A) Time from application of current until full bag inflation.
(B) Bag only partially inflated, reaction stops.
(C) Incomplete ignition of main charge.

In Examples 1-5 the inflatable bag is fully inflated employing the gas generator device of this invention as defined herein. In Examples 6-8 the inflatable bag is not fully inflated. No additional reaction gases are generated after 17 and 18 milliseconds for Examples 6 and 7 respectively.

As the percent of stabilizing agent in the gas generating composition increases up to a maximum amount of about 8 percent by weight, the time to full inflation of the inflatable bag increases employing a constant weight ratio of gas generating composition to ignition composition. This weight ratio can be varied to achieve acceptable bag inflation times employing core initiation.

In loading of the main charge into the gas generator device of this invention, it is necessary that precautions be taken to exclude moisture from the main charge. The main charge should be loaded in a substantially moisture free environment. The internal chamber of the gas generator device optionally can contain a charge of molecular sieves which function to absorb water. The molecular sieves can be held within a fine mesh wire basket or they can be employed as a molded charge. The molecular sieves when employed as described do not interfere with the reaction of the main charge. The sieves also effect an improvement in the long term stability of the main charge. Molecular sieves can be employed in amounts of up to about 20 percent by weight of the weight of the main charge. A precartridge and hermetically sealed cartridge containing the main charge and molecular sieves is particularly desirable.

Pressure responsive devices which can be employed in this invention include any type of pressure release device such as a rupture disc which will release substantially instantaneously in response to pressure exceeding the burst pressure of the rupture disc. For purposes of this invention, the pressure responsive devices must have release pressures of at least 1,500 p.s.i. in order for the reaction of the alkali or alkaline metal nitrite and ammonium salt to proceed to completion at a rate satisfactory for generation of sufficient gases to fill an inflatable confinement of an automobile safety system. Pressure release devices having release pressure in excess of 1,500 p.s.i. are satisfactory and a release pressure of from about 1,700 p.s.i. to about 2,500 p.s.i. is preferred. While release pressures above 2,500 p.s.i. can be employed, it is not generally desirable to do so because of the heavier gas generator bodies required to withstand higher pressures.

Collision sensing elements which can be employed to provide an electrical impulse to the squib of the initiating element for firing said squib include inertia responsive switches, accelerometers and the like. Illustrative collision sensing elements which can be employed are set forth in U.S. Pat. Nos. 2,850,291 and 3,414,292 reference to which is hereby made.

Inflatable bags which can be employed in the automobile safety system are prepared from any suitable material such as nylon or rubber backed nylon.

What we claim and desire to protect by Letters Patent is:

1. A vehicle safety system of the inflatable bag type in which gases are supplied to the inflatable bag of the system said gases being generated in a gas generator device, said safety system having in combination:
   a. a collision sensing means,
   b. a gas generator body having a pressure resistant reaction chamber filled with a non-explosive, gas producing main charge composition capable of self-sustained reaction when initiated to reaction, said composition comprising a substantially moisture free intimate admixture of an alkali or alkaline metal nitrite and ammonium salt, said composition containing at least about 4 percent by weight of a stabilizing agent based on the weight of admixture containing said stabilizing agent,
   c. an initiating element at one end of the pressure resistant reaction chamber operative upon receipt of an electrical impulse from the collision sensing means, said initiating element comprising a squib and an elongate and integral initiating charge extending along the longitudinal axis of the pressure resistant chamber into the main charge, said initiating charge being in a contiguous relationship to the main charge throughout a substantial portion of the length of the main charge,
   d. a discharge orifice at the opposite end of the pressure resistant reaction chamber,
   e. a pressure responsive means sealing said orifice and having a release pressure of at least 1,500 psi,
   f. an inflatable bag communicatively connected to the sealed discharge orifice,
   g. a diffuser means, intermediate the discharge orifice and the inflatable bag, for diffusing the gas discharge from the gas generator device into said bag, said system functioning in response to an electrical impulse generated by the collision sensing means as a result of a collision whereby the main charge is initiated to reaction and the reaction gases rapidly increase the pressure in the pressure resistant chamber until the release pressure of the pressure responsive means is exceeded whereby gas flows into the inflatable bag inflating same.

2. The vehicle safety system of claim 1 wherein the alkali metal nitrite is sodium nitrite and the ammonium salt is ammonium chloride.

3. The vehicle safety system of claim 2 wherein the stabilizing agent for the main charge is magnesium oxide.

4. The vehicle safety system of claim 1 wherein the main charge comprises ammonium bromide and sodium nitrite.

5. The vehicle safety system of claim 1 wherein the main charge comprises ammonium chloride and potassium nitrite.

6. The vehicle safety system of claim 1 wherein the main charge comprises ammonium iodide and sodium nitrite.

7. The vehicle safety system of claim 1 wherein the main charge comprises ammonium bromide and potassium nitrite.

8. The gas generator device of claim 2 wherein the initiating charge comprises a finely divided material selected from the group consisting of boron-potassium-nitrate, boron-lead-chromate, and lead oxide/boron.

9. The gas generating device of claim 2 wherein the initiating charge comprises a heat producing charge selected from the group consisting of boron-potassium-nitrate, boron-lead-chromate, and lead oxide/boron, and a gas producing charge selected from the group consisting of smokeless powder and sodium azide.

10. The gas generator device of claim 9 wherein the heat producing charge is boron-potassium-nitrate and the gas producing charge is smokeless powder.

11. The gas generator device of claim 9 wherein the heat producing charge is boron-potassium-nitrate and the gas producing charge is sodium azide.

12. The vehicle safety system of claim 1 wherein the initiating element comprises an initiating head containing a squib and an initiating charge assembly secured to said initiating head, said initiating charge assembly comprising an elongate container having an open end and a closed end, said container having a plurality of vents and holding a gas producing charge of smokeless powder held within a consumable bag at the closed end of the container and holding a heat producing charge comprising particulate boron-potassium-nitrate held within a consumable bag adjacent to the gas producing charge and filling the remainder of the container, said initiating charge assembly being secured to the head of the initiating element so that the heat producing charge and the squib held are in an operative relationship.

13. The vehicle safety system of claim 2 wherein the gas generator body comprises a head assembly having an open end and a closed end and a closure plate, the closed end of the head assembly having an opening therein for receiving an initiating element, the closure plate being receivable within the open-end of the head assembly and containing a discharge orifice, said closure plate being secured at the open end of the head assembly thereby defining the pressure resistant reaction chamber, and said closure plate having a central projection extending into the pressure resistant chamber, said projection having a plurality of ports positioned at an angle of about 90° to the longitudinal axis of gas generator body, said ports being in communication with the discharge orifice of the closure plate.

* * * * *